(12) United States Patent
Jenko

(10) Patent No.: US 8,142,183 B2
(45) Date of Patent: Mar. 27, 2012

(54) HOT RUNNER INCLUDING NOZZLE-SUPPORT STRUCTURE

(75) Inventor: Edward Joseph Jenko, Essex, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 51 days.

(21) Appl. No.: 12/988,632

(22) PCT Filed: Apr. 29, 2009

(86) PCT No.: PCT/US2009/042008
§ 371 (c)(1),
(2), (4) Date: Oct. 20, 2010

(87) PCT Pub. No.: WO2009/146228
PCT Pub. Date: Dec. 3, 2009

(65) Prior Publication Data
US 2011/0038980 A1    Feb. 17, 2011

(51) Int. Cl.
*B29C 45/20* (2006.01)
(52) U.S. Cl. ........................... 425/549; 425/564; 425/572
(58) Field of Classification Search .................. 425/549, 425/562, 563, 564, 565, 566, 572
See application file for complete search history.

(56) References Cited

U.S. PATENT DOCUMENTS

| | | | |
|---|---|---|---|
| 4,588,367 A | 5/1986 | Schad | |
| 5,955,121 A | 9/1999 | Gellert et al. | |
| 6,840,758 B2 | 1/2005 | Babin et al. | |
| 7,204,687 B2 | 4/2007 | Elliott | |
| 2003/0012845 A1* | 1/2003 | Doyle et al. | 425/562 |
| 2005/0019444 A1* | 1/2005 | Sicilia et al. | 425/564 |
| 2005/0200052 A1* | 9/2005 | Przytulla et al. | 425/566 |
| 2005/0238758 A1* | 10/2005 | Ciccone et al. | 425/572 |
| 2008/0069919 A1* | 3/2008 | Babin et al. | 425/549 |
| 2008/0089975 A1 | 4/2008 | Fairy | |
| 2009/0194910 A1* | 8/2009 | Rosner et al. | 264/328.15 |

* cited by examiner

*Primary Examiner* — Timothy Heitbrink

(57) ABSTRACT

Disclosed is a hot runner (100), including: a first plate (102) having a first-plate alloy; a second plate (104) having a second-plate alloy, the second plate (104) being coupled with the first plate (102), and the second plate (104) and the first plate (102) defining a manifold pocket (213); a manifold (224) being supportively received in the manifold pocket (213), and the manifold (224) having a drop (225); a nozzle assembly (400) being supportively received by the second plate (104), the nozzle assembly (400) connecting with the drop (225) of the manifold (224); and a nozzle-support structure (101), including: a first load-bearing insert (207) contacting the second plate (104), the first load-bearing insert (207) contacting the nozzle assembly (400), the first load-bearing insert (207) having a first insert material being stronger than the second-plate alloy of the second plate (104), the first insert material being strong enough to withstand a first high-point load (150) to be transmitted from the nozzle assembly (400) to the second plate (104) via the first load-bearing insert (207), and the second-plate alloy of the second plate (104) withstands transmission of the first high-point load (150) once the first load-bearing insert (207) distributes the first high-point load (150) to the second plate (104).

10 Claims, 4 Drawing Sheets

HOT RUNNER INCLUDING NOZZLE-SUPPORT STRUCTURE

TECHNICAL FIELD

The present invention generally relates to molding systems, and more specifically the present invention relates to hot runners including a nozzle-support structure, and/or molding systems having hot runners including the nozzle-support structure.

BACKGROUND OF THE INVENTION

Examples of known molding systems are (amongst others): (i) the HYPET (TRADEMARK) Molding System, (ii) the QUADLOC (TRADEMARK) Molding System, (iii) the HYLECTRIC (TRADEMARK) Molding System, and (iv) the HYMET (TRADEMARK) Molding System, all manufactured by Husky Injection Molding Systems (Location: Canada; Web Site: www.husky.ca).

Known hot runners include components that are made from high-cost, high-strength steel alloys. Usage of these alloys is based on several reasons, such as: (i) a desire for corrosion-resistant plates (such as plates made from stainless steel), and/or (ii) a desire for hot-runner components (such as hot runner-to-mold-plate-contact surfaces) that can withstand high point loads: the usage of high-strength steel alloys resist compressive forces and permanent hobbing of hot-runner plates, and thus usage of these alloys may prevent or delay the onset of potential hot-runner failure. High-strength steel alloys are difficult to source, expensive to purchase, require more time to machine, and require expensive equipment and tooling to machine.

U.S. Pat. No. 4,588,367 (Inventor: SCHAD; Published: 1986-05-13) discloses a pressure molding machine of the type having a floating manifold that includes thermal expansion support elements for sealing and centering the nozzles relative to the floating manifold.

U.S. Pat. No. 6,890,473 (Inventor: HO et al.; Published: 2005-05-10) discloses a collar for a hot runner nozzle of an injection molding apparatus. The collar includes a generally cylindrical body having a first flange extending inwardly from a first end thereof. The first flange is provided to abut a nozzle head and at least a portion of a nozzle body of a nozzle. An alignment flange projects from an inner wall of the generally cylindrical body and is spaced from the first flange. The alignment flange contacts the nozzle body to restrict tipping of the collar relative to the nozzle during assembly of the injection molding apparatus.

U.S. Pat. No. 7,232,305 (Inventor: MANDA; Published: 2007-06-19) discloses a load management device configured for a feed body of any one of a molding machine, a hot runner assembly and any combination thereof. The load management device includes a load-transferring body configured to present a load-receiving surface and a load-imparting surface. The load-transferring body is configured to connect the load-receiving surface with the load-imparting surface, to transfer a substantial amount of load-received by the load-receiving surface over to the load-imparting surface, and to transfer an insubstantial amount of load-received by the load-receiving surface over to the feed body.

U.S. Patent Number 2007/0193713 (Inventor: MANDA et al; Published: 2007-08-23) discloses an injection molding system usable for molding of a metal alloy above a solidus temperature of the metal alloy. The injection molding system has a hot runner, including: a manifold plate, and also has a manifold abutting the manifold plate. The manifold has a drop. The manifold is configured to transfer a load to the manifold plate along a direction extending inclined relative to the drop.

PCT Patent Application Number 2002/070226 (Inventor: JENKO; Published: 2002-09-12) discloses an apparatus and process for injecting molten plastic material. The apparatus includes: (i) a nozzle assembly through which plastic material flows, and (ii) a nozzle body with a heater affixed thereto. A mold cavity plate is positioned adjacent the nozzle body and is separable from the nozzle body so that separation of the mold cavity plate from the nozzle body exposes the nozzle body and permits removal of the nozzle body and the heater.

A technical article (title: A USER REPORTS ON FLOATING NEEDLE GATING IN BLACK AND WHITE; page 32; published: February 1994; trade magazine: INJECTION MOLDING) discloses a runnerless modular injection molding system, which is the EQUAFLOW (TRADEMARK) system built by Melt Design (Lombard, Ill., USA). A cross section of a hot runner is depicted.

SUMMARY OF THE INVENTION

According with a first aspect of the present invention, there is provided a hot runner (100), comprising: (i) a first plate (102) having a first-plate alloy; (ii) a second plate (104) having a second-plate alloy, the second plate (104) being coupled with the first plate (102), and the second plate (104) and the first plate (102) defining a manifold pocket (213); (iii) a manifold (224) being supportively received in the manifold pocket (213), and the manifold (224) having a drop (225); (iv) a nozzle assembly (400) being supportively received by the second plate (104), the nozzle assembly (400) connecting with the drop (225) of the manifold (224); and (v) a nozzle-support structure (101), including: a first load-bearing insert (207) contacting the second plate (104), the first load-bearing insert (207) contacting the nozzle assembly (400), the first load-bearing insert (207) having a first insert material being stronger than the second-plate alloy of the second plate (104), the first insert material being strong enough to withstand a first high-point load (150) to be transmitted from the nozzle assembly (400) to the second plate (104) via the first load-bearing insert (207), and the second-plate alloy of the second plate (104) withstands transmission of the first high-point load (150) once the first load-bearing insert (207) distributes the first high-point load (150) to the second plate (104).

According to a second aspect of the present invention, there is provided a molding system (700), comprising: a hot runner (100), including: (i) a first plate (102) having a first-plate alloy; (ii) a second plate (104) having a second-plate alloy, the second plate (104) being coupled with the first plate (102), and the second plate (104) and the first plate (102) defining a manifold pocket (213); (iii) a manifold (224) being supportively received in the manifold pocket (213), and the manifold (224) having a drop (225); (iv) a nozzle assembly (400) being supportively received by the second plate (104), the nozzle assembly (400) connecting with the drop (225) of the manifold (224); and (v) a nozzle-support structure (101), including: a first load-bearing insert (207) contacting the second plate (104), the first load-bearing insert (207) contacting the nozzle assembly (400), the first load-bearing insert (207) having a first insert material being stronger than the second-plate alloy of the second plate (104), the first insert material being strong enough to withstand a first high-point load (150) to be transmitted from the nozzle assembly (400) to the second plate (104) via the first load-bearing insert (207), and the second-plate alloy of the second plate (104) withstands transmission of the first high-point load (150) once the first load-bearing insert (207) distributes the first high-point load (150) to the second plate (104).

A technical effect, amongst other technical effects, of the aspects of the present invention is reduced cost of a hot runner and/or a molding system having a hot runner. For example, since the first insert material of the first load-bearing insert of the nozzle-support structure is stronger than the second-plate alloy of the second plate, the second-plate alloy may be made of a more economical (usually softer) alloy in comparison to the expensive alloys associated with plates of known hot runners (as described above).

BRIEF DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

Figure 1:
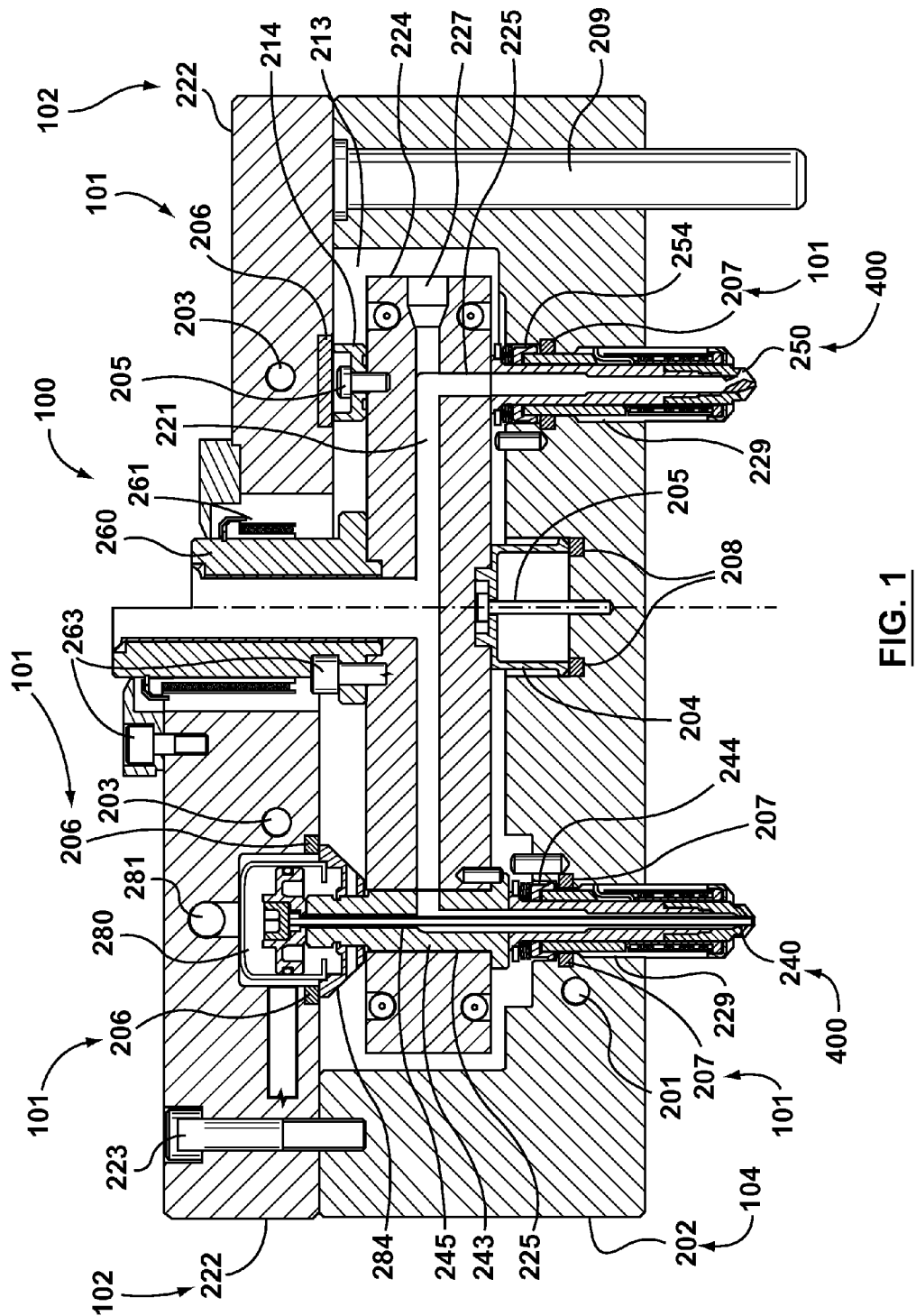
FIG. 1 depicts a cross-sectional view of a hot runner 100 in accordance with a first non-limiting embodiment.
Figure 2B:
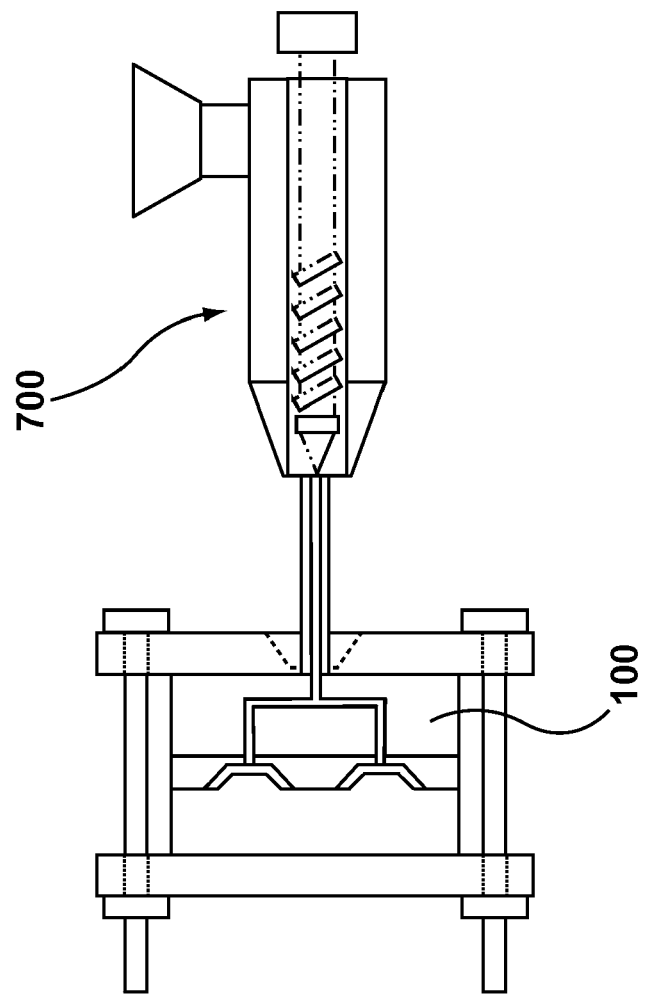
FIG. 2A depicts a schematic representation, at least in part, of the hot runner 100 of FIG. 1.
Figure 3:
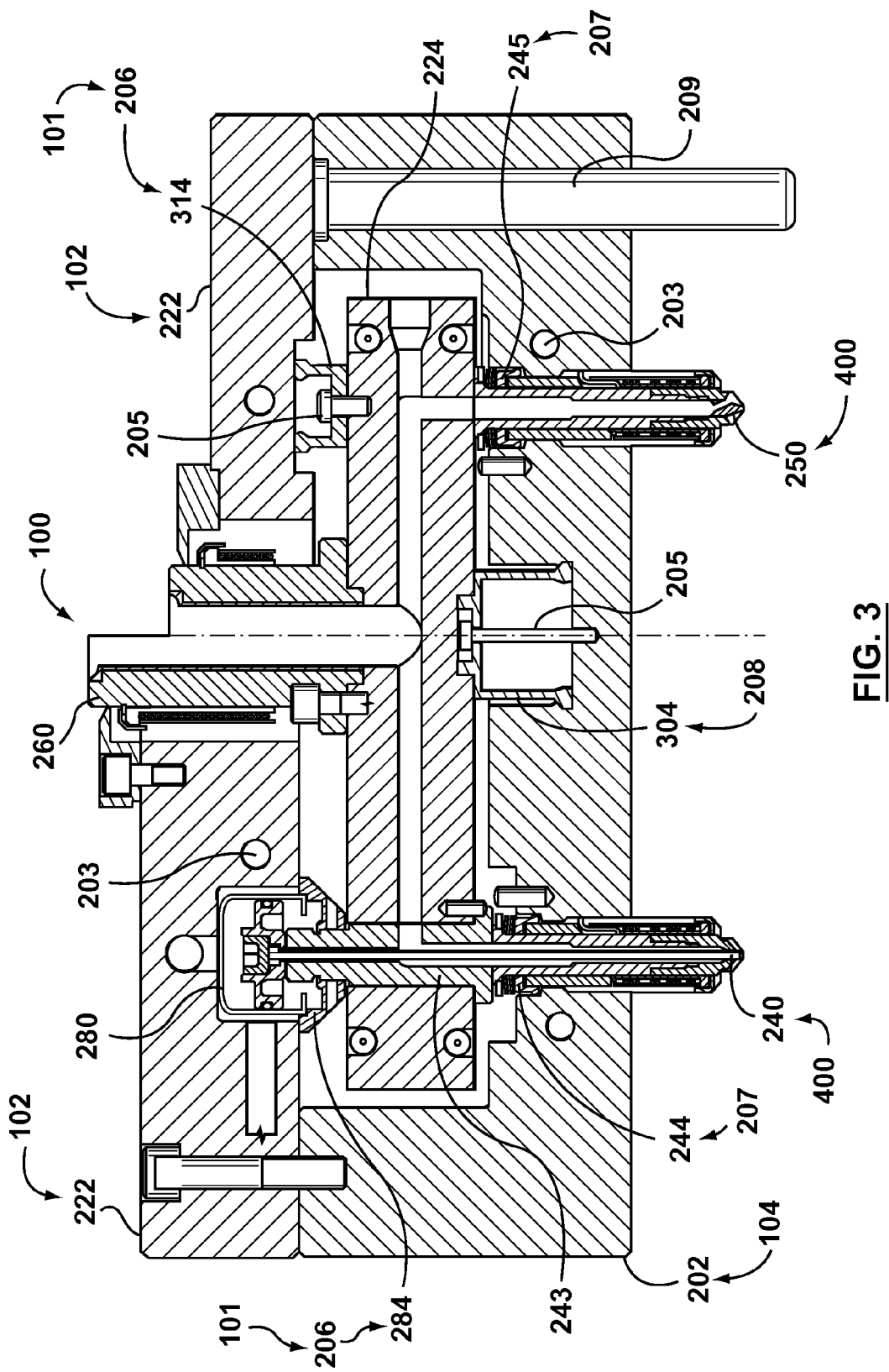
Figure 4:
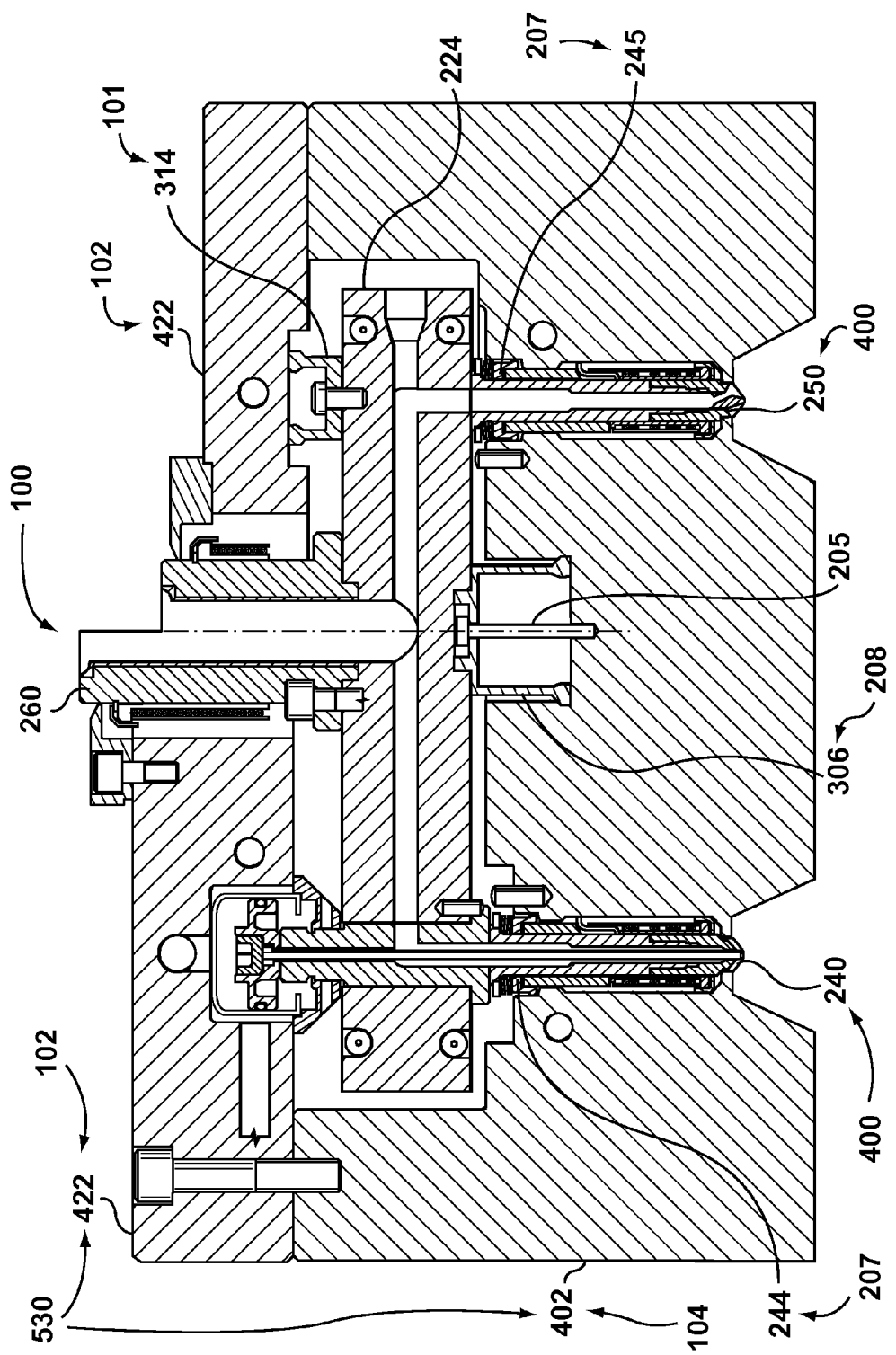

to FIG. 2B depicts a schematic representation of a molding system 700 having the hot runner 100 of FIG. 1;

FIG. 3 depicts a cross-sectional view of the hot runner 100 of FIG. 1 in accordance with a second non-limiting embodiment; and FIG. 4 depicts a cross-sectional view of the hot runner 100 of FIG. 1 in accordance with a third non-limiting embodiment.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE PREFERRED EMBODIMENT(S)

FIG. 1 depicts the cross-sectional view of the hot runner 100. It will be appreciated that the hot runner 100 includes components that are known to those skilled in the art, and these known components will not be described here; these known components are described, at least in part, in the following reference books, for example: (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3$^{rd}$ Edition authored by JOHANNABER (ISBN 3-446-17733-7) and/or (iv) "*Runner and Gating Design Handbook*" authored by BEAUMONT (ISBN 1-446-22672-9).

The hot runner 100 includes: (i) a first plate 102, (ii) a second plate 104, (iii) a manifold 224, (iv) a nozzle assembly 400, and (v) a nozzle-support structure 101. The first plate 102 has a first-plate alloy (such as, for example, a low-strength steel alloy). The first plate 102 includes, by way of example, a manifold-backing plate 222 that has a manifold-backing plate alloy. The second plate 104 has a second-plate alloy (such as, for example, a low-strength steel alloy either the same as the first alloy or different). The second plate 104 includes, by way of example, a manifold plate 202 that has a manifold-plate alloy. Generally, the second plate 104 is coupled with the first plate 102 (preferably by fasteners, such as a fastener 223). Once they are coupled together, the second plate 104 and the first plate 102 define a manifold pocket 213. As depicted in FIG. 1, the manifold plate 202 is coupled with the manifold-backing plate 222 (preferably by the fastener 223); once they are coupled together, the manifold plate 202 and the manifold-backing plate 222 define the manifold pocket 213. The manifold 224 is supportively received in the manifold pocket 213. The manifold 224 has: (i) an output (usually called a drop 225), (ii) an input that is usually connected with a sprue bushing 260, and (iii) a distribution network that connects the input with the output (it will be appreciated that there may be more than one output). The sprue bushing 260 is coupled with a machine nozzle (known and not depicted) of an injection unit (known and not depicted). FIG. 1 depicts the manifold 224 that has two drops 225, and it will be appreciated that the manifold 224 may have a single drop or may have multiple drops (or outputs). The nozzle assembly 400 is supportively received in the nozzle hole 229 of the second plate 104. The nozzle assembly 400 is operatively connected with the drop 225 of the manifold 224, so that the nozzle assembly 400 may receive the melt from the drop 225. The nozzle assembly 400 is also received in a mold gate of a mold assembly (known but not depicted) so that melt may flow from the nozzle assembly 400 to a mold cavity (via the mold gate) of the mold assembly. FIG. 1 depicts two examples of the nozzle assembly 400, which are: (i) a valve-type nozzle 240, and (ii) a thermal-type nozzle 250.

The nozzle-support structure 101 includes a first load-bearing insert 207. The first load-bearing insert 207 contacts the second plate 104. The first load-bearing insert 207 contacts the nozzle assembly 400. The first load-bearing insert 207 has a first insert material that is stronger than the second-plate alloy of the second plate 104. The first insert material may be, for example, a high-strength steel alloy, such as stainless steel AISI 420, AISI P20 (also known as mold steel), alloy 4140, or the like. The first insert material may also be made from material that is strong but has lower thermal conductivity than the manifold plate 202 and/or a nozzle shoulder (such as a nozzle shoulder 244 of the valve-type nozzle 240). A strong but thermally insulating material such as ceramic may be used, and this arrangement advantageously reduces heat losses from the (typically hotter) manifold 224 to the (typically colder) manifold plate 202.

The manifold plate 202 is configured to receive a guide pin 209 that is used to locate the manifold plate 202 with the mold assembly (known and not depicted). The manifold plate 202 includes or defines: (i) a cooling circuit 201 (which is well known in the art and therefore will not be described here in detail), and (ii) the nozzle hole 229 that is configured to receive the nozzle assembly 400 and to permit connection of the nozzle assembly 400 with the drop 225 of the manifold 224. The manifold-backing plate 222 defines a cooling circuit 203 (the cooling circuit 203 is well known in the art). The manifold-backing plate 222 is configured to receive the sprue bushing 260, so that the sprue bushing 260 may connect with the input of the manifold 224. A sprue-bushing heater 261 is coupled with the sprue bushing 260. A sprue-bushing fastener 263 couples or connects the sprue bushing 260 with the manifold-backing plate 222.

The manifold 224 includes or defines a melt channel 221 that is configured to convey the melt from the input to the outputs of the manifold 224. The manifold 224 defines a plug receiver 227 that connects with the melt channel 221. The plug receiver 227 is configured to receive a manifold plug (known and not depicted). The purpose of the plug receiver 227 and the manifold plug is known to those skilled in the art and therefore will not be further described in any detail.

Figure 2A:
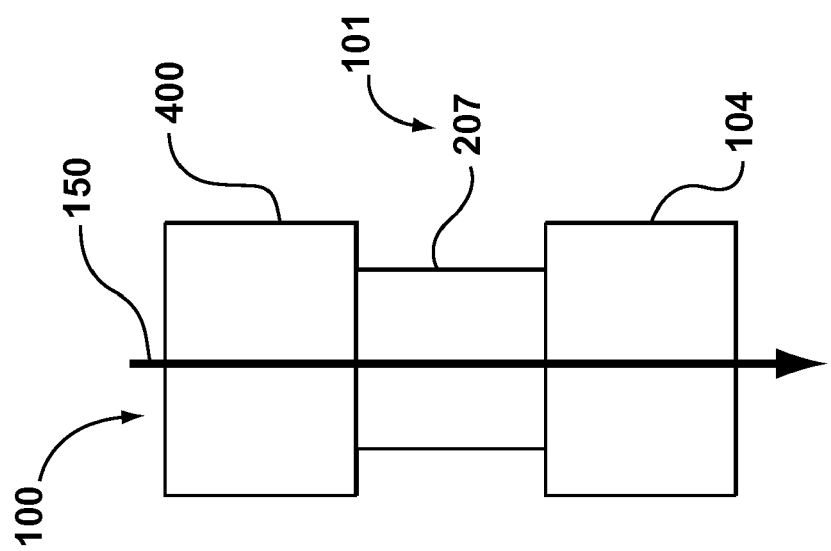

According to a non-limiting variant, the nozzle-support structure 101 further includes a second load-bearing insert 206. The second load-bearing insert 206 contacts the first plate 102, and couples with the manifold 224 at an outer surface area of the manifold 224 that is located opposite of the drop 225. The second load-bearing insert 206 has a second insert material that is stronger than the first-plate alloy of the first plate 102. The second insert material is strong enough to withstand a second high-point load (not depicted, but an example of the high-point load is depicted in FIG. 2A) to be transmitted from the manifold 224 to the first plate 102 via the second load-bearing insert 206. The first-plate alloy of the first plate 102 withstands transmission of the second high-point load once the second load-bearing insert 206 distributes the second high-point load to the first plate 102. A technical effect, amongst other technical effects, of the second insert material is reduced cost of the hot runner 100 and/or a molding system 700 having the hot runner 100. For example, since the second insert material of the second load-bearing insert 206 of the nozzle-support structure 101 is stronger than the first-plate alloy of the first plate 102, the first-plate alloy may be made of a more economical (usually softer) alloy in comparison to alloys associated with plates of known hot runners.

According to a non-limiting variant, the nozzle assembly 400 includes a thermal-type nozzle 250, and the second load-bearing insert 206 includes an insert portion (which may include a heat-insulating material) that abuts the manifold-backing plate 222 and a manifold stand-off 214. The manifold stand-off 214 is located between the insert portion and the manifold 224. The manifold stand-off 214 may include a heat-insulating material as well. A stand-off fastener 205 connects the manifold stand-off 214 with the manifold 224.

According to a non-limiting variant, the hot runner 100 further includes a manifold stand-off 204 and a manifold load-bearing insert 208. The manifold stand-off 204 abuts the manifold 224 and abuts the second plate 104. A stand-off fastener 205 couples the manifold stand-off 204 with the second plate 104. The manifold load-bearing insert 208 abuts the manifold stand-off and abuts the second plate 104. The manifold load-bearing insert 208 has a third insert material that is stronger than the second-plate alloy of the second plate 104. The third insert material is strong enough to withstand a third high-point load (not depicted but an example of the high-point load is depicted in FIG. 2A) to be transmitted from the manifold 224 to the second plate 104 via the manifold load-bearing insert 208. The second-plate alloy of the second plate 104 withstands transmission of the third high-point load once the manifold load-bearing insert 208 distributes the third high-point load to the second plate 104.

FIG. 2A depicts the schematic representation of the hot runner 100 of FIG. 1. The first insert material of the first load-bearing insert 207 is strong enough to withstand a first high-point load 150 to be transmitted from the nozzle assembly 400 to the second plate 104 via the first load-bearing insert 207.

According to a non-limiting variant, the nozzle assembly 400 includes a nozzle shoulder 244 (which is also called a nozzle-locating element or an insulator) of: (i) the valve-type nozzle 240, or (ii) a nozzle shoulder 254 of the thermal-type nozzle 250. The first high-point load 150 is to be transmitted from the nozzle shoulder 244 to the second plate 104 via the first load-bearing insert 207. The first insert material is strong enough to withstand the first high-point load 150 (preferably, without the second plate 104 becoming deformed but some deformation of the second plate 104 may be permitted). The second-plate alloy of the second plate 104 withstands transmission of the first high-point load 150 once the first load-bearing insert 207 distributes the first high-point load 150 to the second plate 104; specifically, the second-plate alloy of the second plate 104 withstands transmission of the first high-point load 150 so that preferably the second plate 104 does not become permanently deformed but some deformation of the second plate 104 may be permitted. That is, the second plate 104 is deformably resilient during application of the first high-point load 150.

According to a non-limiting variant, the nozzle assembly 400 includes the valve-type nozzle 240. The valve-type nozzle 240 includes a manifold bushing 243 that is received in the manifold 224, and the manifold bushing 243 forms part of the melt channel 221 of the manifold 224. The valve-type nozzle 240 also includes a valve stem 245 that is coupled with a valve actuator 280. The manifold-backing plate 222 defines an air supply 281 that is coupled with the valve actuator 280. The air supply 281 is used to energize or de-energize the valve actuator 280 so that the valve stem 245 may be reciprocated as required. The air supply 281 is bidirectional with an air-supply-control assembly (not depicted, but known) operatively connected to the air supply 281. The valve-type nozzle 240 also includes an actuator stand off 284, which may include a heat-insulating material. The actuator stand off 284 abuts the manifold-backing plate 222 and the manifold 224. The manifold bushing 243 extends through the actuator stand off 284 and into the valve actuator 280. The second load-bearing insert 206 abuts the manifold-backing plate 222 and the actuator stand off 284. According to a non-limiting variant, two air circuits (not depicted) are used to actuate the valve stem 245, in which one of the air circuits is used to energize the valve actuator 280, and the other air circuit is used to de-energize the valve actuator 280.

FIG. 2B depicts the schematic representation of the molding system 700 that has the hot runner 100 of FIG. 1. The molding system 700 may include components that are known to persons skilled in the art, and these known components will not be described here; these known components are described, at least in part, in the text books identified above.

FIG. 3 depicts the cross-sectional view of the hot runner 100, in which the nozzle assembly 400 includes a thermal-type nozzle 250, and the second load-bearing insert 206 includes a manifold stand-off 314 (which advantageously may include a heat-insulating material such as ceramic or the like) abutting the manifold-backing plate 222. The manifold stand-off 314 is located between the manifold-backing plate 222 and the manifold 224. The stand-off fastener 205 connects the manifold stand-off 314 with the manifold 224.

According to another non-limiting variant, the hot runner 100 further includes a manifold stand-off 304 that abuts the manifold 224 and also abuts the second plate 104. A stand-off fastener 205 couples the manifold stand-off 204 with the second plate 104. The manifold stand-off 304 has a third insert material that is stronger than the second-plate alloy of the second plate 104. The third insert material is strong enough to withstand a third high-point load (not depicted) to be transmitted from the manifold 224 to the second plate 104 via the manifold stand-off 304. The second-plate alloy of the second plate 104 withstands transmission of the third high-point load once the manifold stand-off 304 distributes the third high-point load to the second plate 104.

FIG. 4 depicts the cross-sectional view of the hot runner 100, in which the first plate 102 includes a cavity-backing plate 422 of a mold assembly 530. The second plate 104 includes a cavity plate 402 of the mold assembly 530. The cavity-backing plate 422 has a cavity-backing plate alloy. The cavity plate 402 has a cavity-plate alloy. The cavity plate 402 is coupled with the cavity-backing plate 422. The cavity plate 402 and the cavity-backing plate 422 define the manifold pocket that receives the manifold 224.

The description of the non-limiting embodiments provides non-limiting examples of the present invention; these non-limiting examples do not limit the scope of the claims of the present invention. The non-limiting embodiments described are within the scope of the claims of the present invention.

The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is protected by way of letters patent are limited only by the scope of the following claims:

What is claimed is:

1. A hot runner (100), comprising:
   a first plate (102) having a first-plate alloy;
   a second plate (104) having a second-plate alloy, the second plate (104) being coupled with the first plate (102), and the second plate (104) and the first plate (102) defining a manifold pocket (213);
   a manifold (224) being supportively received in the manifold pocket (213), and the manifold (224) having a drop (225);
   a nozzle assembly (400) being supportively received by the second plate (104), the nozzle assembly (400) connecting with the drop (225) of the manifold (224); and
   a nozzle-support structure (101), including:
      a first load-bearing insert (207) contacting the second plate (104), the first load-bearing insert (207) contacting the nozzle assembly (400), the first load-bearing insert (207) having a first insert material being stronger than the second-plate alloy of the second plate (104), the first insert material being strong enough to withstand a first high-point load (150) to be transmitted from the nozzle assembly (400) to the second plate (104) via the first load-bearing insert (207), and the second-plate alloy of the second plate (104) withstands transmission of the first high-point load (150) once the first load-bearing insert (207) distributes the first high-point load (150) to the second plate (104).

2. The hot runner (100) of claim 1, wherein:
   the nozzle-support structure (101) further includes:
      a second load-bearing insert (206) contacting the first plate (102), and the second load-bearing insert (206) coupling with the manifold (224) at an area of the manifold (224) being located opposite of the drop (225), the second load-bearing insert (206) having a second insert material being stronger than the first-plate alloy of the first plate (102), the second insert material being strong enough to withstand a second high-point load to be transmitted from the manifold (224) to the first plate (102) via the second load-bearing insert (206), and the first-plate alloy of the first plate (102) withstands transmission of the second high-point load once the second load-bearing insert (206) distributes the second high-point load to the first plate (102).

3. The hot runner (100) of claim 1, wherein:
   the first plate (102) includes:
      a manifold-backing plate (222) having a manifold-backing plate alloy;
   the nozzle-support structure (101) further includes:
      a second load-bearing insert (206) contacting the first plate (102), and the second load-bearing insert (206) coupling with the manifold (224) at an area of the manifold (224) being located opposite of the drop (225), the second load-bearing insert (206) having a second insert material being stronger than the first-plate alloy of the first plate (102), the second insert material being strong enough to withstand a second high-point load to be transmitted from the manifold (224) to the first plate (102) via the second load-bearing insert (206), and the first-plate alloy of the first plate (102) withstands transmission of the second high-point load once the second load-bearing insert (206) distributes the second high-point load to the first plate (102); and
   the nozzle assembly (400) includes:
      a thermal nozzle (250); and
   the second load-bearing insert (206) includes:
      an insert portion abutting the manifold-backing plate (222); and
      a manifold stand-off (214) being located between the insert portion and the manifold (224).

4. The hot runner (100) of claim 1, wherein:
   the first plate (102) includes:
      a manifold-backing plate (222) having a manifold-backing plate alloy;
   the nozzle-support structure (101) further includes:
      a second load-bearing insert (206) contacting the first plate (102), and the second load-bearing insert (206) coupling with the manifold (224) at an area of the manifold (224) being located opposite of the drop (225), the second load-bearing insert (206) having a second insert material being stronger than the first-plate alloy of the first plate (102), the second insert material being strong enough to withstand a second high-point load to be transmitted from the manifold (224) to the first plate (102) via the second load-bearing insert (206), and the first-plate alloy of the first plate (102) withstands transmission of the second high-point load once the second load-bearing insert (206) distributes the second high-point load to the first plate (102); and
   the nozzle assembly (400) includes:
      a valve nozzle (240) including:
         a manifold bushing (243) being received in the manifold (224), and the manifold bushing (243) forming part of a melt channel (221) of the manifold (224);
         a valve actuator (280);
         a valve stem (245) being coupled with the valve actuator (280); and
         an actuator stand off (284) abutting the manifold-backing plate (222) and the manifold (224), and
   wherein the second load-bearing insert (206) abuts the manifold-backing plate (222) and the actuator stand off (284).

5. The hot runner (100) of claim 1, further comprising:
   a manifold stand-off (204) abutting the manifold (224) and the second plate (104), the manifold stand-off (204) coupling with the second plate (104); and a manifold load-bearing insert (208) abutting the manifold stand-off and the second plate (104), the manifold load-bearing insert (208) having a third insert material being stronger than the second-plate alloy of the second plate (104), the third insert material being strong enough to withstand a third high-point load to be transmitted from the manifold (224) to the second plate (104) via the manifold load-bearing insert (208), and the second-plate alloy of the second plate (104) withstands transmission of the third high-point load once the manifold load-bearing insert (208) distributes the third high-point load to the second plate (104).

6. The hot runner (100) of claim 1, wherein:
the first plate (102) includes:
   a manifold-backing plate (222) having a manifold-backing plate alloy; and
the second plate (104) includes:
   a manifold plate (202) having a manifold-plate alloy, the manifold plate (202) being coupled with the manifold-backing plate (222), and the manifold plate (202) and the manifold-backing plate (222) defining the manifold pocket (213).

7. The hot runner (100) of claim 1, wherein:
the first plate (102) includes:
   a cavity-backing plate (422) of a mold assembly (530), and the cavity-backing plate (422) having a cavity-backing plate alloy; and
the second plate (104) includes:
   a cavity plate (402) of the mold assembly (530), the cavity plate (402) having a cavity-plate alloy, the cavity plate (402) being coupled with the cavity-backing plate (422), and the cavity plate (402) and the cavity-backing plate (422) defining the manifold pocket (213).

8. The hot runner (100) of claim 1, wherein:
the first plate (102) includes:
   a manifold-backing plate (222) having a manifold-backing plate alloy;
the nozzle-support structure (101) further includes:
   a second load-bearing insert (206) contacting the first plate (102), and the second load-bearing insert (206) coupling with the manifold (224) at an area of the manifold (224) being located opposite of the drop (225), the second load-bearing insert (206) having a second insert material being stronger than the first-plate alloy of the first plate (102), the second insert material being strong enough to withstand a second high-point load to be transmitted from the manifold (224) to the first plate (102) via the second load-bearing insert (206), and the first-plate alloy of the first plate (102) withstands transmission of the second high-point load once the second load-bearing insert (206) distributes the second high-point load to the first plate (102); and
the nozzle assembly (400) includes:
   a thermal nozzle (250); and
the second load-bearing insert (206) includes:
   a manifold stand-off (314) abutting the manifold-backing plate (222), the manifold stand-off (314) being located between the manifold-backing plate (222) and the manifold (224).

9. The hot runner (100) of claim 1, further comprising:
a manifold stand-off (304) abutting the manifold (224) and the second plate (104), the manifold stand-off (304) having a third insert material being stronger than the second-plate alloy of the second plate (104), the third insert material being strong enough to withstand a third high-point load to be transmitted from the manifold (224) to the second plate (104) via the manifold stand-off (304), and the second-plate alloy of the second plate (104) withstands transmission of the third high-point load once the manifold stand-off (304) distributes the third high-point load to the second plate (104).

10. A molding system (700), comprising:
a hot runner (100), including:
   a first plate (102) having a first-plate alloy;
   a second plate (104) having a second-plate alloy, the second plate (104) being coupled with the first plate (102), and the second plate (104) and the first plate (102) defining a manifold pocket (213);
   a manifold (224) being supportively received in the manifold pocket (213), and the manifold (224) having a drop (225);
   a nozzle assembly (400) being supportively received by the second plate (104), the nozzle assembly (400) connecting with the drop (225) of the manifold (224); and
   a nozzle-support structure (101), including:
      a first load-bearing insert (207) contacting the second plate (104), the first load-bearing insert (207) contacting the nozzle assembly (400), the first load-bearing insert (207) having a first insert material being stronger than the second-plate alloy of the second plate (104), the first insert material being strong enough to withstand a first high-point load (150) to be transmitted from the nozzle assembly (400) to the second plate (104) via the first load-bearing insert (207), and the second-plate alloy of the second plate (104) withstands transmission of the first high-point load (150) once the first load-bearing insert (207) distributes the first high-point load (150) to the second plate (104).

* * * * *